United States Patent
Hyun

(10) Patent No.: US 8,608,100 B2
(45) Date of Patent: Dec. 17, 2013

(54) FISHING REEL WITH CLICKING SOUND GENERATING MEANS

(75) Inventor: Kwang-Ho Hyun, Bucheon (KR)

(73) Assignee: Doyo Engineering Co., Ltd (KR)

( * ) Notice: Subject to any disclaimer, the term of this patent is extended or adjusted under 35 U.S.C. 154(b) by 345 days.

(21) Appl. No.: 13/037,752

(22) Filed: Mar. 1, 2011

(65) Prior Publication Data

US 2011/0215183 A1 Sep. 8, 2011

(30) Foreign Application Priority Data

Mar. 8, 2010 (KR) ........................ 10-2010-0020344

(51) Int. Cl.
 *A01K 89/01* (2006.01)
(52) U.S. Cl.
 USPC .......................................... 242/306; 242/308
(58) Field of Classification Search
 USPC ................... 242/305, 306, 307, 308
 See application file for complete search history.

(56) References Cited

U.S. PATENT DOCUMENTS

| | | | | |
|---|---|---|---|---|
| 5,007,602 A | * | 4/1991 | Carlsson | 242/246 |
| 5,518,194 A | * | 5/1996 | Jeung | 242/283 |
| 5,692,692 A | * | 12/1997 | Zwayer | 242/244 |
| 5,857,632 A | * | 1/1999 | Arkowski | 242/297 |
| 6,354,526 B1 | * | 3/2002 | Morise | 242/295 |
| 7,175,121 B2 | * | 2/2007 | Ikuta | 242/307 |
| 7,222,810 B1 | * | 5/2007 | Littau et al. | 242/305 |
| 7,226,013 B1 | * | 6/2007 | Kang | 242/306 |
| 2003/0136866 A1 | * | 7/2003 | Kitajima et al. | 242/307 |
| 2005/0145735 A1 | * | 7/2005 | Ikuta | 242/307 |

FOREIGN PATENT DOCUMENTS

| | | |
|---|---|---|
| JP | 2009-034005 | 2/2009 |
| KR | 10-2005-0035965 | 4/2005 |
| KR | 10-2005-0108098 | 11/2005 |
| KR | 100665068 | 12/2006 |

* cited by examiner

*Primary Examiner* — Emmanuel M Marcelo
(74) *Attorney, Agent, or Firm* — Cantor Colburn LLP

(57) ABSTRACT

A fishing reel includes a central shaft, a drive gear coupled to the central shaft, a spool connected to the drive gear and winding a fishing line thereon, a drive washer mounted to the central shaft to interlock with the central shaft, an auxiliary washer mounted to the central shaft and having a projection to interlock with the drive gear, and a clicking sound generator. The clicking sound generator includes a click member operated in conjunction with the central shaft or the drive gear and having a spring contact part, and a click spring operated in conjunction with the drive gear or the central shaft and having a protruding part coming into contact with the spring contact part, and an elastic part integrated with the protruding part to put the protruding part in contact with the spring contact part.

10 Claims, 12 Drawing Sheets

FISHING REEL WITH CLICKING SOUND GENERATING MEANS

BACKGROUND OF THE INVENTION

1. Field of the Invention

The present invention relates generally to fishing reels with clicking sound generating means and, more particularly, to a fishing reel, which includes a clicking sound generating means formed using various washers arranged between a drive gear operated in conjunction with a spool for winding a fishing line thereon and a central shaft for the drive gear, thus enabling easy manufacture and assembly while minimizing the changes made to the structure of a conventional fishing reel, and ensuring a superior clicking sound generating function while having cost competitiveness, therefore providing a rhythmical clicking sound for enhancing the attractiveness of fishing, in addition to preventing the fishing line from being damaged or cut by a pre-existing brake function.

2. Description of the Related Art

An earlier patent disclosure that deals with the art of generating a clicking sound when a spool is rotated as a fishing line unwinds is disclosed in Korean Patent No. 0547269 of BANAX Co., Ltd., which was registered on Jan. 20, 2006 and is entitled 'clicking sound generating device of fishing reel'. This device is constructed so that a user turns on or off a clicking sound. However, the device is problematic in that its construction is complicated, so that assemblability and productivity are low, and it fails easily.

Further, Korean Patent No. 0665068 of HYUPSUNG Precision Co., Ltd, which was registered on Dec. 28, 2006 and is entitled 'fishing reel', discloses a structure which has a clicking pin on a drag plate which rotates along with the rotation of a main shaft. The click pin is elastically biased by a coil spring type of click spring to continuously collide with a click notch and thereby generate a clicking sound.

However, such a structure makes assembly difficult and easily breaks.

Japanese Patent Laid-Open Publication No. 2009-34005 of DAIWA Precision Co., Ltd, which was laid open on Feb. 19, 2009, is similar to the above patent No. 0665068 and has the same problems as does the patent No. 0665068.

The applicant of the present invention is a company specializing in the field of fishing reels and possesses many intellectual properties in the field of reels. Among them, Korean Patent No. 0508962, which was registered on Aug. 9, 2005 and is entitled 'clicking sound generating device for bait reel', discloses a fishing reel with a clicking sound generating means.

This patent is directed to a clicking sound generating device which is mounted to a tension nut that controls a casting distance by adjusting the rotational speed of a spool shaft using frictional force. The device is constructed so that a click spring comes into contact with a click plate having on an inner circumference thereof a spring contact part, thus generating a clicking sound.

The inventor(s) of the present invention changed and expanded on the spirit of patent No. 0508962, and thus are proposing a fishing reel which generates a clicking sound while a spool is rotated by the unwinding of a fishing line when a fish takes the bait.

SUMMARY OF THE INVENTION

Accordingly, the present invention has been made keeping in mind the above problems occurring in the prior art, and an object of the present invention is to provide a fishing reel, which includes a clicking sound generating means having a click member with a spring contact part and a click spring with a protruding part that is in frictional contact with the spring contact part, these parts being formed using various washers arranged between a drive gear operated in conjunction with a spool for winding a fishing line thereon and a central shaft for the drive gear, thus enabling easy assembly, improving productivity, reducing a defective rate and a failure rate, ensuring cost competitiveness, and allowing the parts of a conventional fishing reel to stay the same without being changed, therefore maximizing cost competitiveness and remarkably increasing the convenience of stock clearance.

Another object of the present invention is to provide a fishing reel, in which a drive washer or a separate click plate is utilized as a click member, an auxiliary washer interlocking with a drive gear is utilized as a click spring or a separate click spring is adopted as the click spring, and the auxiliary washer, a drive gear, or a ratchet is utilized to independently hold the click spring or a holder serves as a separate holding member.

A further object of the present invention is to provide a fishing reel, in which, when an auxiliary washer is used as a click spring, it is integrated with the auxiliary washer by cutting and bending a predetermined portion of the auxiliary washer, thus minimizing the number of parts.

Yet another object of the present invention is to provide a fishing reel having a clicking sound generating means which implements a double clicking sound function so as to provide a rhythmical and unique clicking sound for enhancing the attractiveness of fishing, in addition to implementing a pre-existing brake function for preventing a fishing line from being damaged or cut.

Still another object of the present invention is to provide a fishing reel, which enables easy manufacture and assembly while minimizing the changes made to the structure of a conventional fishing reel, and provides a superior clicking sound generating means while having cost competitiveness, thus providing a rhythmical clicking sound that enhances the attractiveness of fishing, in addition to preventing a fishing line from being damaged or cut by a pre-existing brake function.

In order to accomplish the above objects, the present invention provides a fishing reel including a central shaft; a drive gear coupled to the central shaft; a spool connected to the drive gear, with a fishing line being wound around an outer circumference of the spool; a drive washer mounted to the central shaft to interlock with the central shaft; an auxiliary washer mounted to the central shaft, and having on an outer circumference thereof a projection to interlock with the drive gear; and a clicking sound generating means including a click member operated in conjunction with the central shaft or the drive gear and having a spring contact part, and a click spring operated in conjunction with the drive gear or the central shaft and having a protruding part coming into contact with the spring contact part of the click member, and an elastic part integrated with the protruding part to put the protruding part in contact with the spring contact part.

Further, the click spring of the clicking sound generating means may be integrated with the auxiliary washer by cutting and bending a predetermined portion of the auxiliary washer.

The drive washer may function as the click member of the clicking sound generating means, and the spring contact part may be provided on the drive washer. Further, the click spring of the clicking sound generating means may be integrated with the auxiliary washer by cutting and bending a predetermined portion of the auxiliary washer, and may comprise a plurality of click springs, and a plurality of spring contact parts may be provided on the click member to correspond to the click springs.

Furthermore, the click spring of the clicking sound generating means may be coupled to a holding member.

The holding member may be a holder which is secured to the drive gear.

The holding member may be provided on the auxiliary washer.

Further, the click member of the clicking sound generating means may be a click plate, and the click plate may interlock with the drive washer.

The click member of the clicking sound generating means may be a click plate, and the click plate may interlock with the drive gear.

The drive washer may function as the click member of the clicking sound generating means, and the spring contact part may be provided on the drive washer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
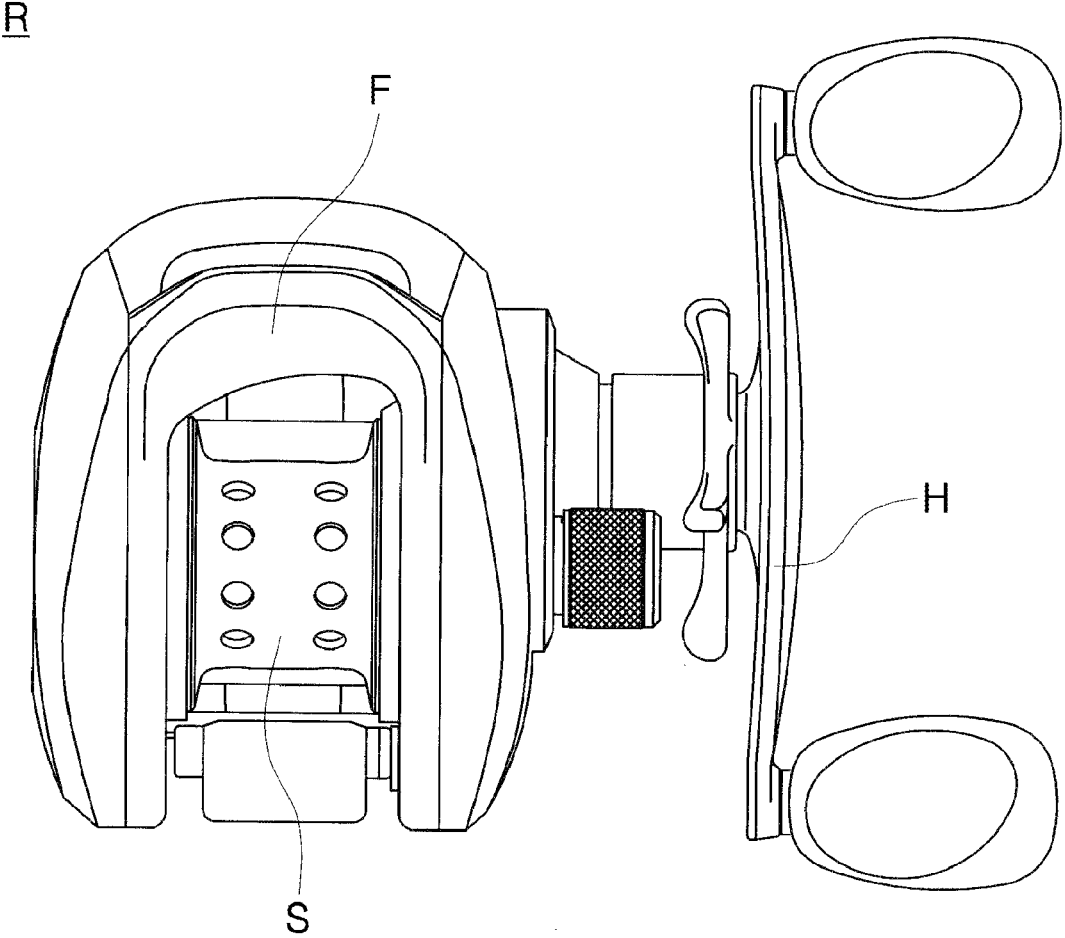
FIG. 1 is a perspective view illustrating an external appearance of a fishing reel according to the present invention.

Hereinafter, the present invention will be described in detail with reference to the accompanying drawings.

Since the present invention may be variously modified and embodied, embodiments or aspects of this invention will be described in detail herein. However, the embodiments are illustrative and not restrictive, so that it is to be understood that all changes, equivalences, and substitutions thereof that fall within the scope and spirit of the present invention are embraced by the present invention.

The same reference numerals throughout the drawings, that is, the same reference numerals in a second digit and a first digit, or in a second digit, a first digit, and an alphabet character denote components having the same or similar function. If there is no special mention, the components denoted by the reference numerals are to be comprehended as components complying with the above-mentioned reference scheme.

The terms used in the specification are used just for illustrating embodiments or aspects, and are not intended to restrict the present invention. The expression of a singular form includes the expression of the plural as long as they are not clearly different from each other in the context. Terms used herein, for example, the terms 'include' and 'comprise' should be understood as merely meaning the existence of characteristics, numerals, steps, operations, components, and parts described in the specification or combinations thereof, and not to be exclusionary of the existence of one or more different characteristics, numerals, steps, operations, components, and parts or combinations thereof.

Unless specifically defined, all terms used herein including technical or scientific terms have the meanings that are commonly understood by those skilled in the art. Terms which are generally used and defined in a dictionary should not be interpreted as being limited merely to common and dictionary meanings. Further, excessive interpretation of the terms must be avoided unless the terms are not clearly defined herein.

Terms described herein, for example, the terms 'first' and 'second' are merely designated to distinguish different components from each other, regardless of the order in which the components are manufactured. The terms of the description may not be consistent with those of the claims.

FIG. 1 is a schematic perspective view showing an external appearance of a fishing reel R according to the present invention. As shown in the drawing, the fishing reel R includes a spool S mounted to a frame F. The fishing reel R is provided with a handle H which is used to wind a fishing line (not shown) around the spool S.

Hereinafter, clicking sound generating means according to embodiments of the present invention will be described with reference to FIGS. 2 through 12. When viewing each drawing in a counterclockwise direction, a sectional view of assembled important parts is on the upper portion of the left-hand side of the drawing, a plan view of the important parts is on the middle portion of the left-hand side, a perspective view of the important parts is on the lower portion of the left-hand side, and an exploded perspective view is on the right-hand side.

Figure 2:
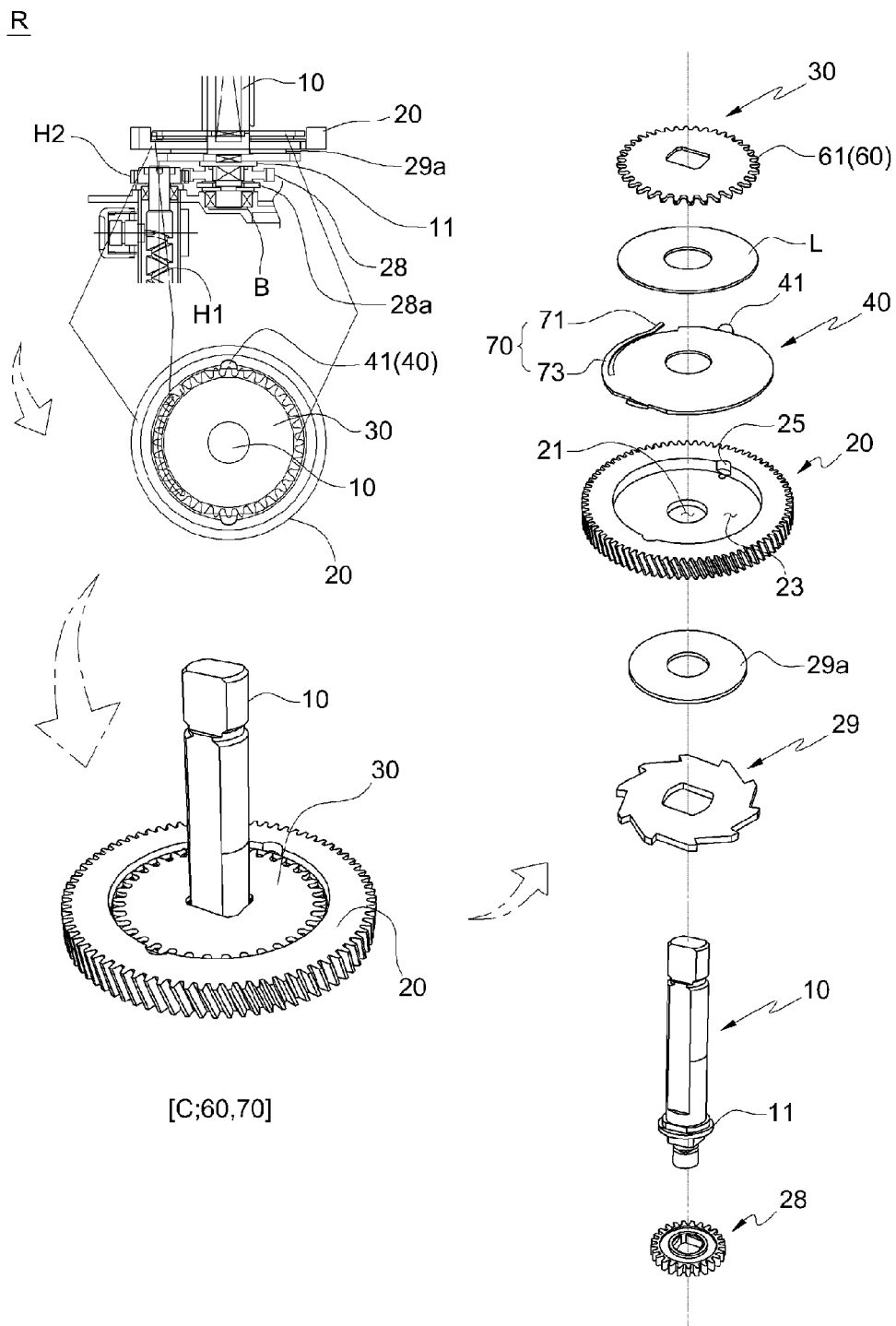
FIGS. 2 to 12 are views illustrating clicking sound generating means of fishing reels according to various modifications of the present invention, in assembly views and exploded perspective views.
Figure 3:
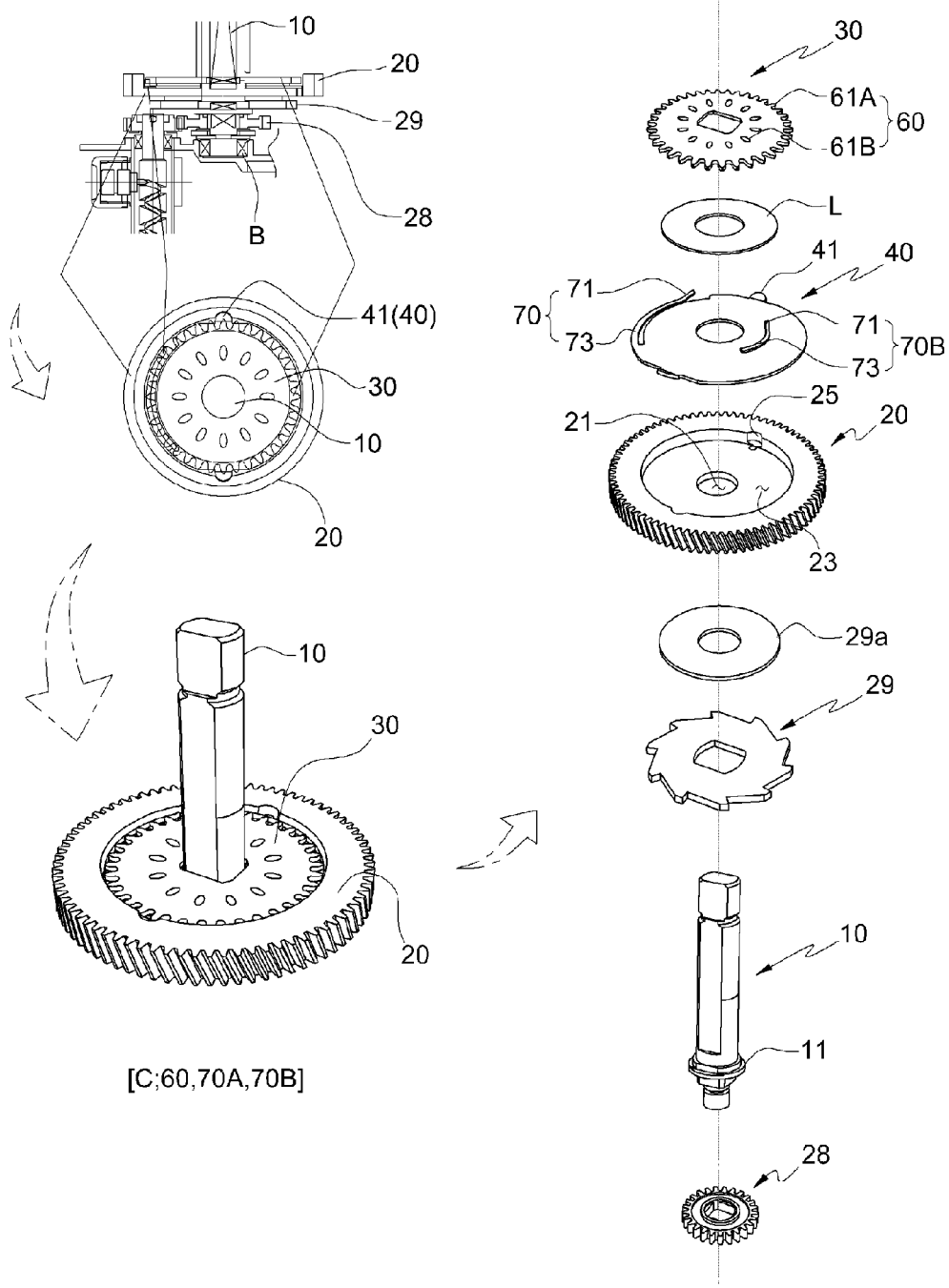

First, fishing reels R shown in FIGS. 2 and 3 have the smallest number of parts. Fishing reels R of FIGS. 4 to 12 have six washers above a drive gear 20 (see the exploded perspective view), whereas the fishing reels R of FIGS. 2 and 3 have only three washers.

In the sectional view showing the assembled important parts on the upper portion of the left-hand side of FIG. 2, when the handle H is turned to wind in the fishing line, a driven gear 28, which engages with an interlocking gear H2 provided on an end of a handle shaft H1 of the handle H (see FIG. 1), is rotated, so that a central shaft 10 and a drive gear 20 rotate in conjunction with the driven gear 28.

However, when a fish takes the bait, so that the fishing line unwinds, the drive gear 20 is rotated but the central shaft 10 is not rotated by the rotation of the spool S. Thus, the driven gear 28, the interlocking gear H2, and the handle H are not rotated. However, the interlocking or non-interlocking between respective components by the winding or unwinding of the fishing line may be variously changed as necessary.

Although not shown in FIG. 2, the drive gear 20 is connected to the spool S.

A drive washer 30, a lubrication washer L, an auxiliary washer 40, a drive gear 20, a first washer 29a, and a ratchet 29 are sequentially coupled to the central shaft 10 in such a way as to be positioned above a locking projection 11 (see the exploded perspective view on the right-hand side).

In the sectional view showing the assembled important parts on the upper portion of the left-hand side, the driven gear 28, a second washer 28a (not shown in the exploded perspective view of the right-hand side), and a bearing B (not shown in the exploded perspective view of the right-hand side) are coupled to the central shaft 10 in such a way as to be positioned under the locking projection 11.

Since the above-mentioned important-part assembling structure is the same as that of FIGS. 3 to 12 except for the number of washers, it will be omitted from the description of FIGS. 3 to 12 for the sake of convenience.

The clicking sound generating means C that is the focus of the present invention includes a click member having a spring contact part, and a click spring having a protruding part which comes into contact with the spring contact part to generate a frictional sound, namely, a clicking sound.

Particularly when the spool S is rotated by the unwinding of the fishing line, if the click member is rotated to generate a clicking sound, the click spring must not rotate but must be fixed.

For the sake of providing a comprehensive description, the click member is described herein as interlocking with the central shaft or the drive gear, and the click spring is described herein as interlocking with the drive gear or the central shaft.

That is, if the click member interlocks with the central shaft, the click spring interlocks with the drive gear. In contrast, if the click member interlocks with the drive gear, the click spring interlocks with the central shaft.

Here, the term 'interlock' means that two corresponding members are directly coupled with each other to be operated, and means in addition that two corresponding members are indirectly coupled via another component to be operated.

Turning back to FIG. 2, the click member 60 is formed on the drive washer 30 which is mounted to the central shaft 10 to interlock with the central shaft 10. That is, the spring contact part 61 that is the important part of the click member 60 is provided on the outer portion of the drive washer 30 in a toothed form. A shaft hole of the click member 60 has a non-circular shape.

Meanwhile, the click spring 70 constitutes the clicking sound generating means C, together with the click member 60 comprising the spring contact part 61. The click spring 70 is provided on the auxiliary washer 40 which is mounted to the central shaft 10 and has on an outer circumference thereof a projection 41 that is used to make the auxiliary washer 40 interlock with the drive gear 20. Here, a shaft hole of the auxiliary washer 40 has a circular shape, so that idle rotation is possible regardless of the rotation of the central shaft 10.

Since the projection 41 of the auxiliary washer 40 engages with an interlocking hole 25 formed on an outer edge of a receiving part 23 of the drive gear 20 that receives the washers 30, 40, and L, the auxiliary washer 40 may be operated in conjunction with the drive gear 20. Further, since a shaft hole 21 of the drive gear 20 also has a circular shape, idle rotation is possible regardless of the rotation of the central shaft 10.

In more detail, the click spring 70 of the clicking sound generating means C is integrated with the auxiliary washer 40 by cutting and bending a predetermined portion of the auxiliary washer 40. Such a construction affords the ease of manufacture, the convenience of assembly, and the convenience of re-assembly performed after it has been disassembled for maintenance, and uses existing parts without change, thus increasing the convenience of stock clearance and remarkably reducing manufacturing cost, therefore enhancing the cost competitiveness of a product.

The click spring 70 comprising a kind of plate spring includes a protruding part 71 which is in contact with the spring contact part 61 of the click member 60, and an elastic part 73 which is integrated with the protruding part 71 to make the protruding part 71 come into contact with the spring contact part 61.

The click spring 70 integrated with the auxiliary washer 40 may also be seen from FIGS. 3 to 6.

In FIG. 2, the spring contact part 61 of the click member 60 and the protruding part 71 of the click spring 70 are shaped so as to be put in contact with each other at the contact surface between the two washers 30 and 40.

If the spool S is rotated by the unwinding of the fishing line, the drive gear 20 interlocks with the auxiliary washer 40, so that the click spring 70 is rotated. The drive washer 30 is fixed together with the central shaft 10. Thus, the protruding part 71 of the click spring 70 collides with the spring contact part 61 while moving up and down along the spring contact part 61, thus generating a clicking sound, thus providing a rhythmical clicking sound for enhancing the attractiveness of fishing, in addition to preventing the fishing line from being damaged or cut by the pre-existing brake function.

Meanwhile, if the drive washer 30 and the auxiliary washer 40 of FIG. 2 are made of metal, especially a stainless material, the lubrication washer L is made of a carbon material or other material that has the ability to lubricate. This may be identically applied to the embodiments of FIGS. 3 to 12 except for the number of lubrication washers (three lubrication washers are applied to the embodiments of FIGS. 4 to 12).

Next, the clicking sound generating means C of FIG. 3 will be described. This is the same as the clicking sound generating means C of FIG. 2 in that the click spring integrated with the auxiliary washer 40 is formed by cutting and bending a predetermined portion of the auxiliary washer 40. However, unlike the clicking sound generating means C of FIG. 2, two click springs 70A and 70B are provided, and two spring contact parts 61A and 61B are provided to the click member 60 in such a way as to correspond to the click springs 70A and 70B, respectively. The second spring contact part 61B is formed in the drive washer 30 by punching to correspond to the second click spring 70B.

If necessary, even in the case of there being one click spring as shown in FIG. 2, it is not formed by cutting the outer portion of the auxiliary washer 40 but may be formed by cutting an inner portion of the auxiliary washer 40, as in the click spring 70B of FIG. 3. In this case, the spring contact part of the click member may also be formed at a position that corresponds to that of the click spring.

Three or more spring contact parts and click springs may be formed as necessary.

Further, the first and second spring contact parts 61A and 61B are arranged to alternate with each other, thus reinforcing the pre-existing brake function, and generating a unique double clicking sound.

Moreover, by adjusting the number and interval of the spring contact parts and click springs, clicking sounds may be generated at regular or irregular intervals, thus rhythmically generating various clicking sounds and considerably enhancing the competitiveness of a product.

Figure 4:
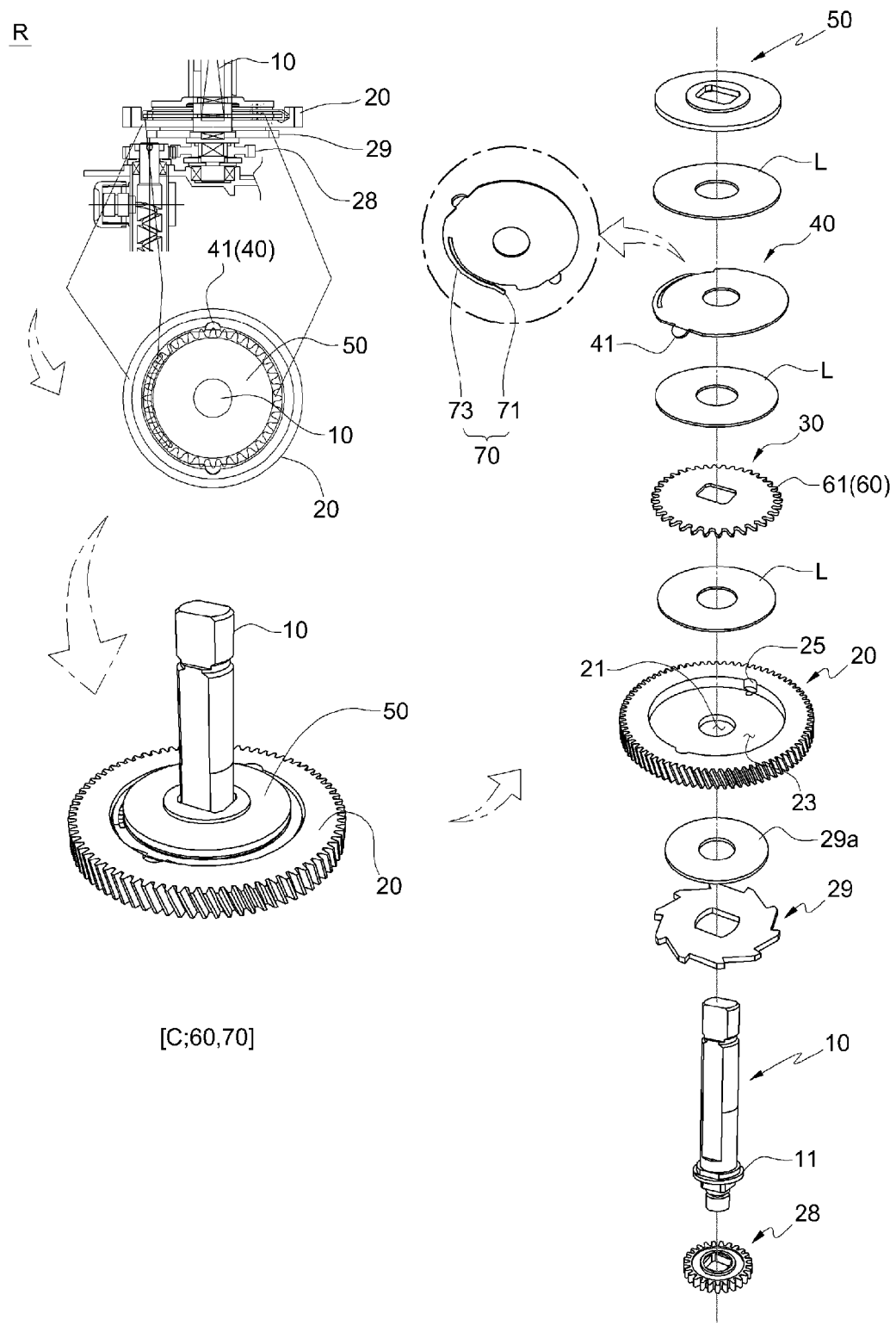

Next, according to the embodiment of FIG. 4, a cover washer 50, a lubrication washer L, an auxiliary washer 40, another lubrication washer L, a drive washer 30, and a further lubrication washer L are sequentially layered above the locking projection 11 of the central shaft 10. The washers are seated in the receiving part 23 of the drive gear 20.

Since a shaft hole of the cover washer 50 has a non-circular shape, it always interlocks with the central shaft 10. Thus, the cover washer 50 is a kind of drive washer.

The construction of FIG. 4 is different from that of FIG. 2 in that the number of washers is increased. That is, one cover washer and two lubrication washers are added to the construction of FIG. 2. Further, the positions of the drive washer 30 and the auxiliary washer 40 are different from those of FIG. 2. Thus, the protruding part 71 of the click spring 70 integrated with the auxiliary washer 40 is bent downwards as shown in FIG. 4.

Similarly to the construction of FIG. 2, in the construction of FIG. 4, the spring contact part 61 of the click member 60 and the protruding part 71 of the click spring 70 are shaped so as to be put in contact with each other at the contact surface between the two washers 30 and 40.

Figure 5:
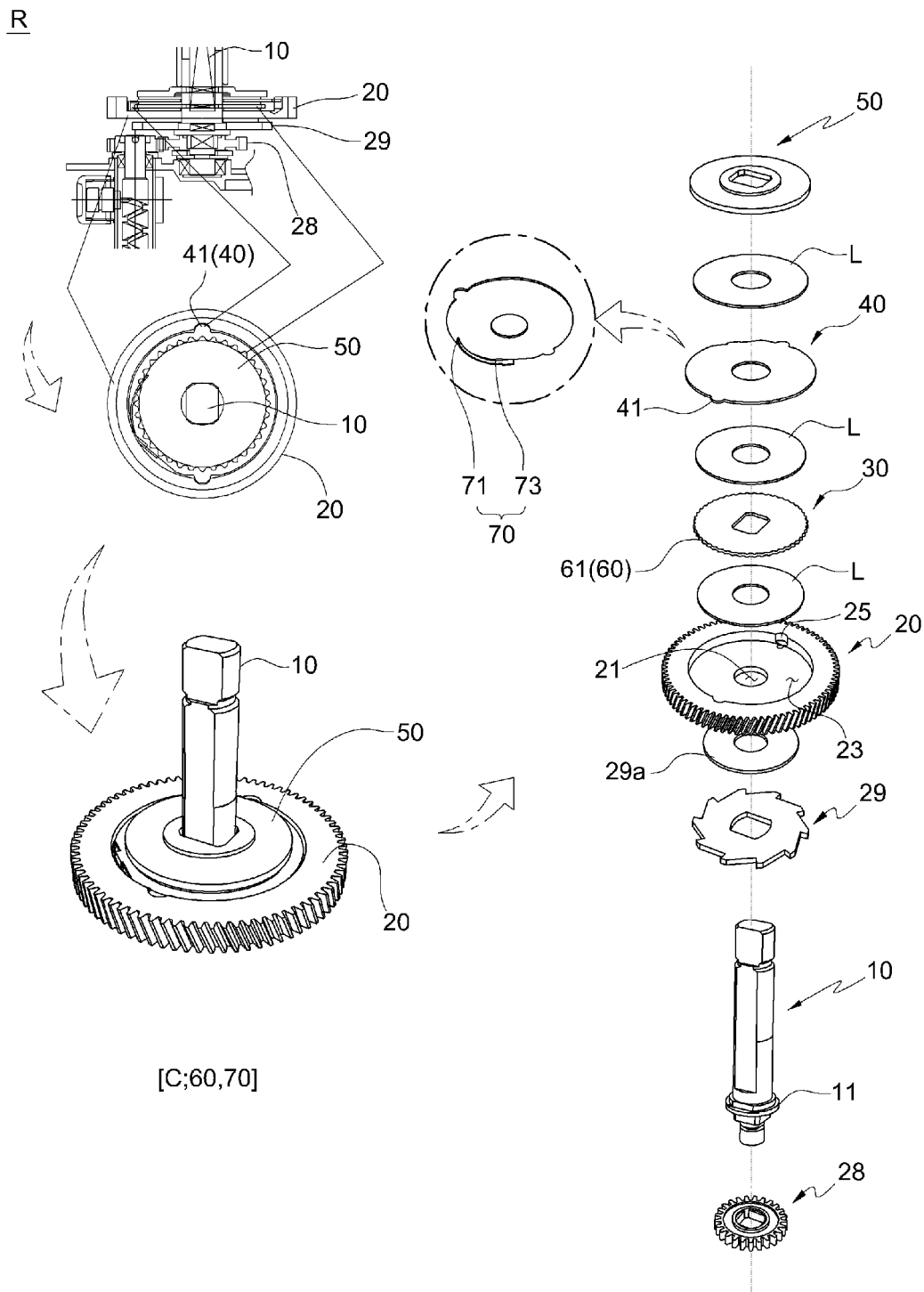

The embodiment of FIG. 5 is different from that of FIG. 4 in that the spring contact part 61 of the click member 60 and the protruding part 71 of the click spring 70 make contact with each other at the outer circumference of the drive washer 30.

Thus, the protruding part 71 of the click spring 70 is provided on the lower portion of the auxiliary washer 40 in such a way as to be bent towards the shaft hole.

Teeth of the spring contact part 61 of the click member 60 are formed to be shorter than those of FIG. 4.

In the description of the types of contact made between the spring contact part of the click member and the protruding part of the click spring, the terms of 'contact surface' and 'outer circumference' are not absolute concepts. That is, when viewing the clicking sound generating means in the exploded perspective view on the right-hand side of each drawing, the 'contact surface' contact designates a vertical contact between parts mounted to the central shaft 10, whereas the 'outer circumference' contact designates a radial contact between parts with respect to the central shaft 10. The 'contact surface' contact and the 'outer circumference' contact are used to distinguish these types of contact from each other.

In the embodiments of FIGS. 2 to 5, the spring contact part 61 which is the most important part of the click member 60 is provided on the drive washer 30. In contrast, according to the embodiment of FIG. 6, the click member 60 is implemented by a separate member. For the convenience, such a click member 60 is designated as a 'click plate 60P' herein.

Unlike the independent 'click plate' that is a physically separate member, the 'click member' denotes the case wherein a component, such as the drive washer, has the function of the 'spring contact part' as well as its pre-existing function.

The spring contact part 61 of the click plate 60P is in the form of a crown gear which comes into contact with the protruding part 71 of the click spring 70 integrated with the auxiliary washer 40 at a contact surface to thus generate a clicking sound.

Both the 'spring contact part' formed on the drive washer and the 'spring contact part' of the independent click plate are terms selected only in consideration of the function of generating a clicking sound, as the protruding part 71 of the click spring 70 collides with the spring contact part 61 while moving up and down along the spring contact part 61. A difference in shape is not taken into consideration.

When the spool S rotates, the click spring 70 is operated in conjunction with the spool S, but the click plate 60P must be stopped. Thus, one or more interlocking holes 63, especially four interlocking holes 63, are formed in the inner circumference of the click plate 60P, and one or more interlocking protrusions 31, especially four interlocking protrusions 31, are formed on the drive washer 30 to engage with the interlocking holes 63.

Figure 6:
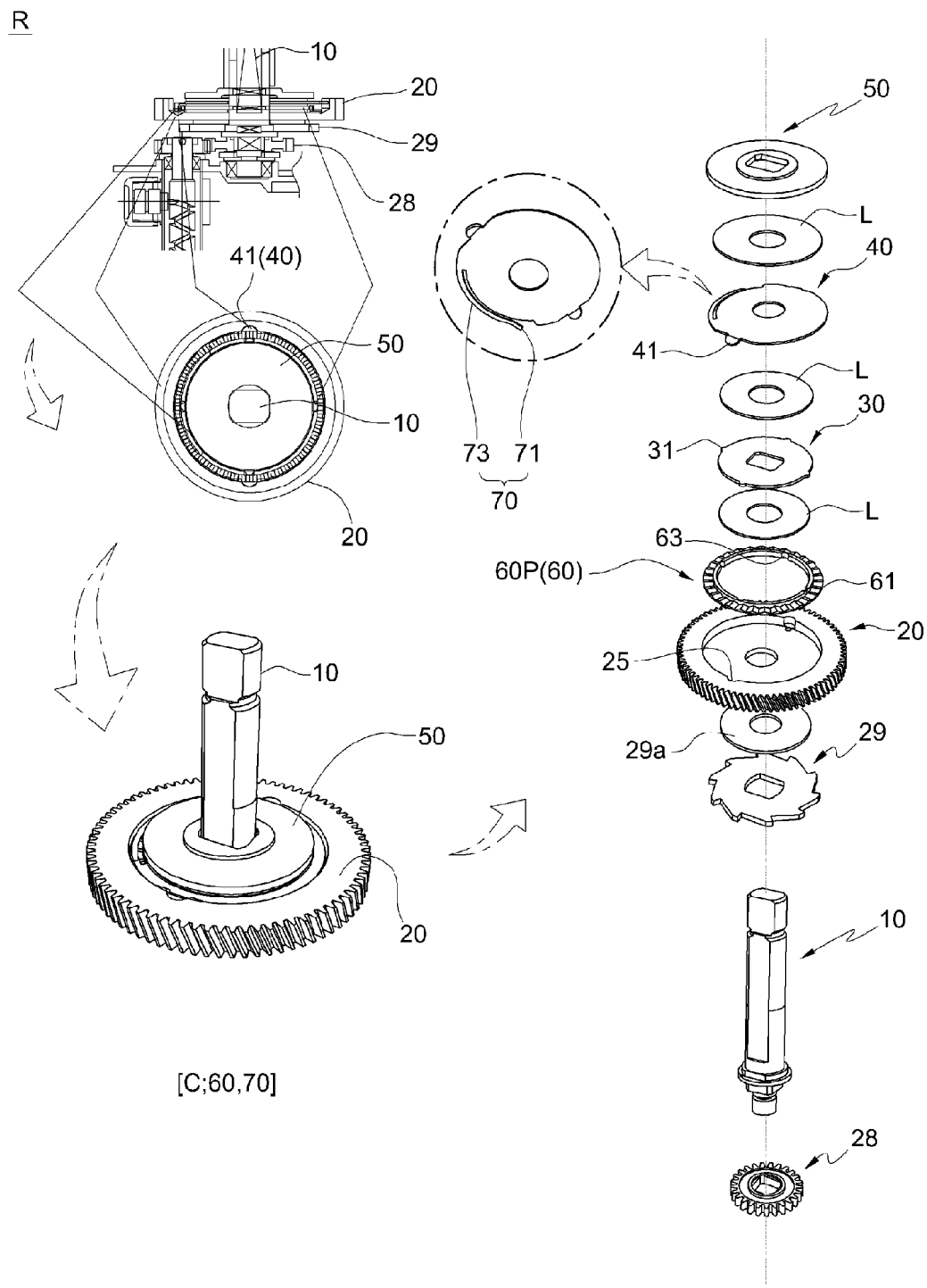
Figure 7:
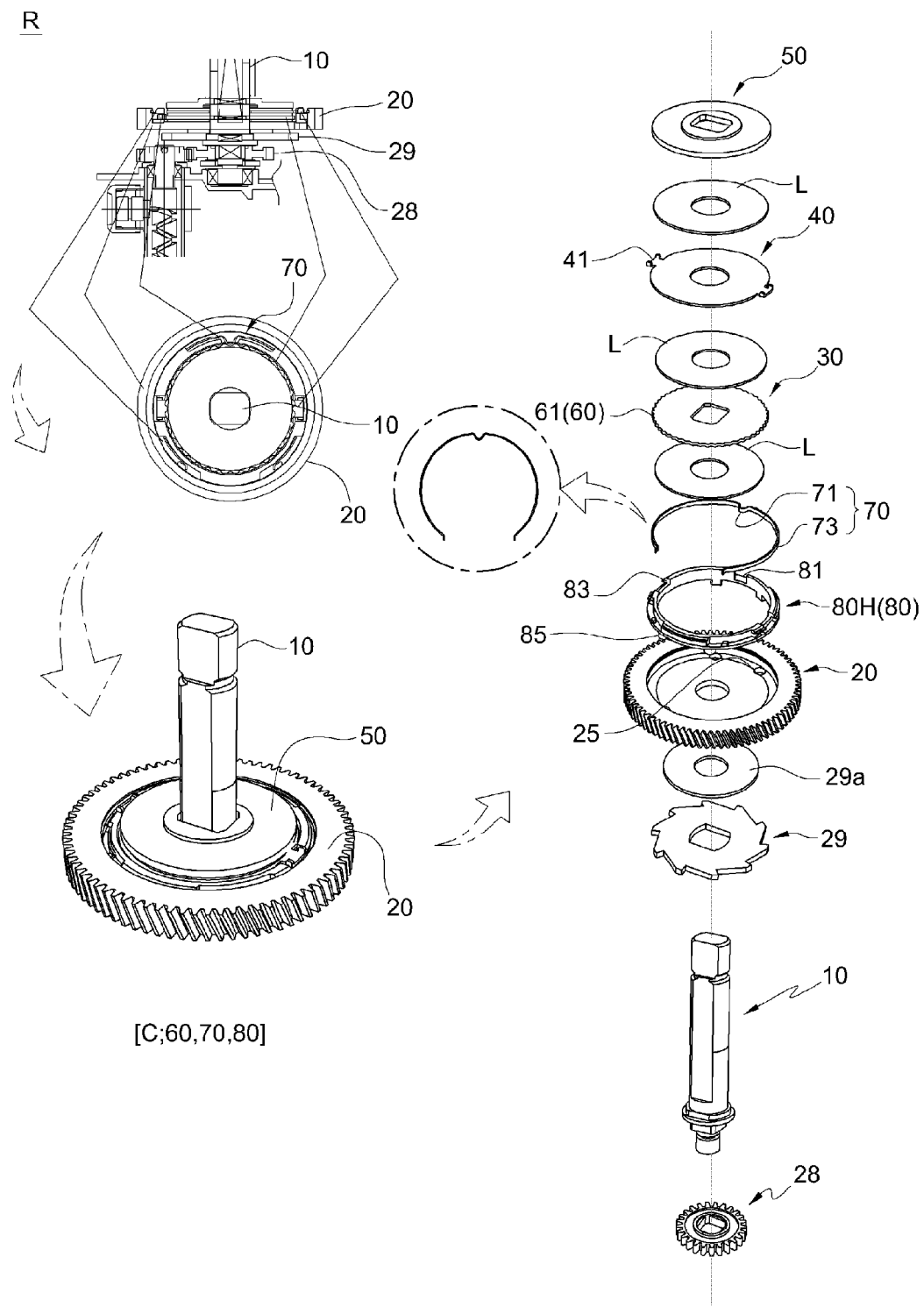

FIG. 7 shows an independent click spring 70, in place of the click spring 70 integrated with the auxiliary washer 40 of FIGS. 2 to 6. The spring contact part 61 of the click member 60 which is in contact with the protruding part 71 of the click spring 70 is formed on the drive washer 30. The spring contact part 61 of the click member 60 and the protruding part 71 of the click spring 70 are shaped to be in contact with each other at the outer circumference of the drive washer 30.

Meanwhile, the click spring 70 of the clicking sound generating means C is coupled to a holding member 80. Particularly, the holding member 80 comprises an independent holder 80H. The terms of the 'holding member' and the 'holder' are substantially identical with each other in terms of the function of holding the click spring, but are differently designated herein to distinguish the holding member and the holder from each other for the sake of convenience. Since the click spring 70 must be operated in conjunction with the spool S in comparison to the drive washer 30 which is operated in conjunction with the central shaft 10, the holder 80H has a lower interlocking projection 85 which engages with the interlocking hole 25 of the drive gear 20. Further, the holder 80H has an interlocking slit 83 which engages with the projection 41 of the auxiliary washer 40. The holder 80H also includes an exposure part 81 to which the protruding part 71 is coupled in such a way as to be exposed, so that the protruding part 71 of the click spring 70 may come into contact with the spring contact part 61 formed on the outer circumference of the drive washer 30 placed on the inner circumference of the holder 80H.

Figure 8:
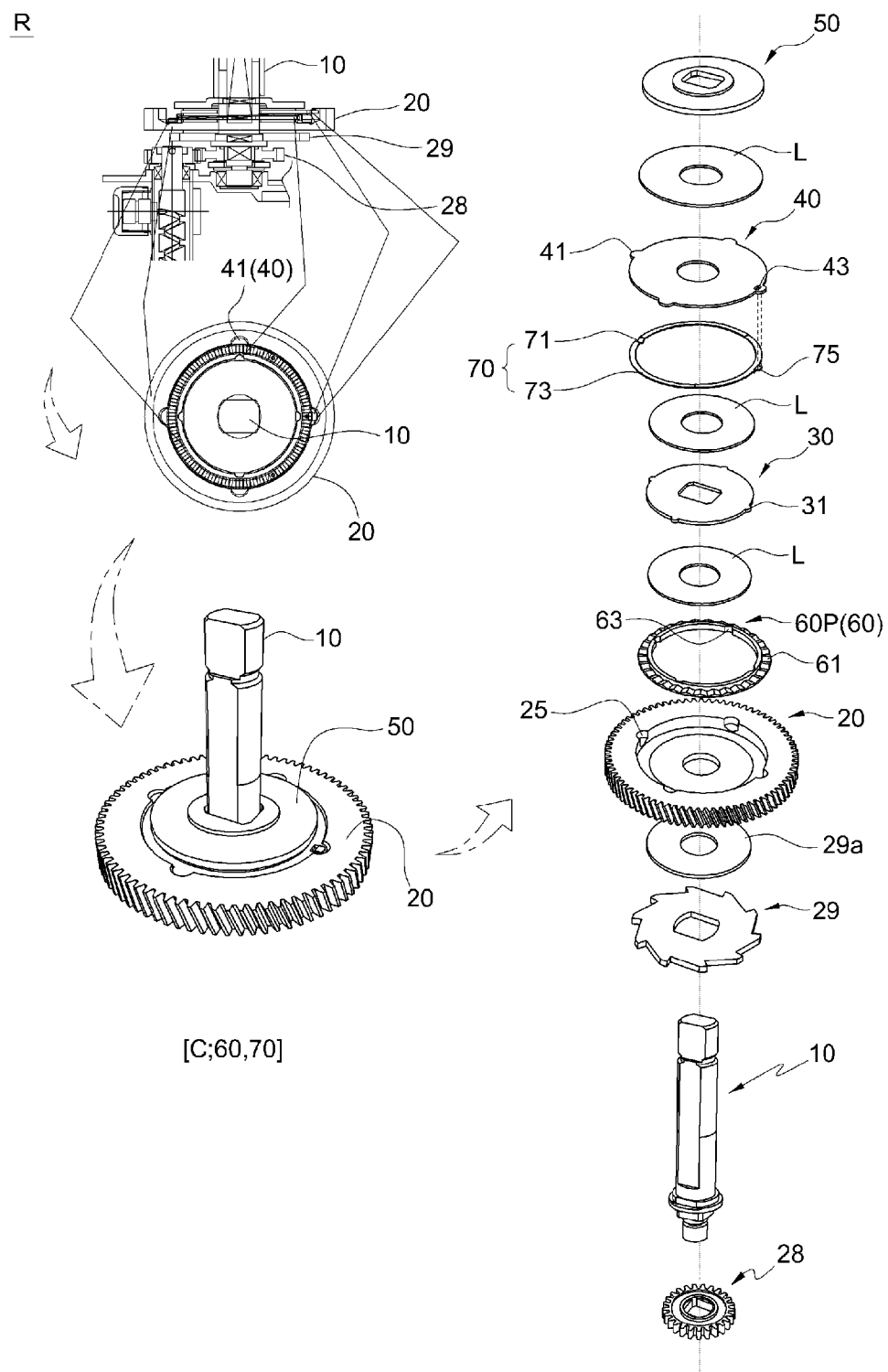

FIG. 8 shows a modification wherein both the click spring 70 and the click plate 60P have independent structures.

Similarly to the click plate 60P of FIG. 6, the click plate 60P of FIG. 8 has the interlocking hole 63 that corresponds to the interlocking protrusion 31 to make the click plate 60P interlock with the drive washer 30.

The crown gear type of spring contact part 61 of the click plate 60P and the protruding part 71 of the click spring 70 engage with each other in a vertical direction, so that they are also in contact with each other at the 'contact surface'.

Further, unlike the click spring of FIG. 7, the independent click spring 70 is coupled to a coupling hole 43 of the auxiliary washer 40 via a coupling projection 75 without the independent holder, so that the click plate 60P is fixed but the click spring 70 may rotate unlike when the spool S rotates.

The coupling projection 75 of the click spring 70 is bent at an end thereof so as to prevent the unexpected removal of the coupling projection 75 inserted into the coupling hole 43 of the auxiliary washer 40.

Figure 9:
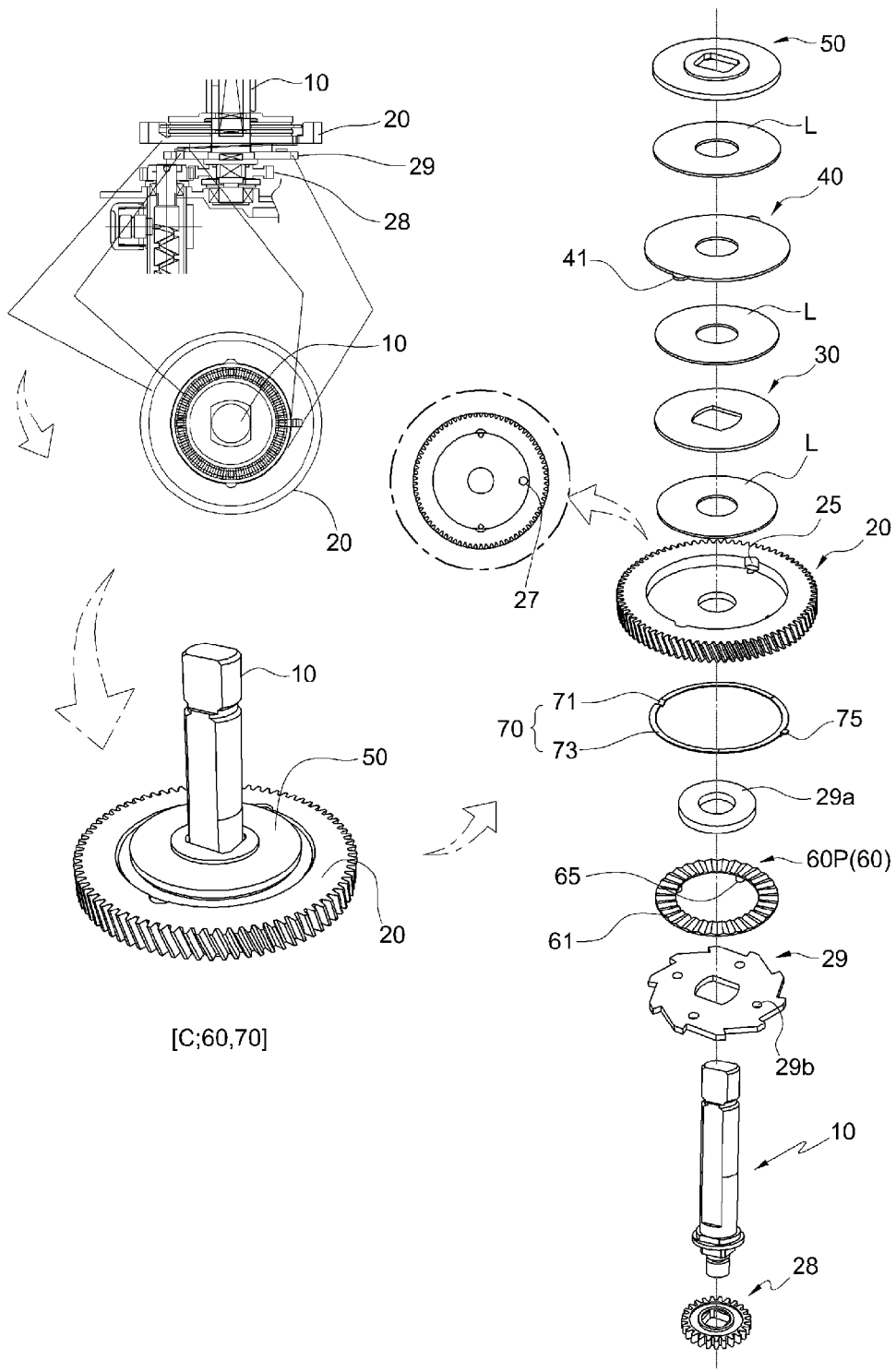

Unlike the embodiments of FIGS. 2 to 8, the click member 60 (or the click plate 60P) and the click spring 70 of FIG. 9 are disposed under the drive gear 20, as seen in the exploded perspective view of the right-hand side of the drawing.

First, similarly to the click spring 70 of FIG. 8, the click spring 70 is coupled via the coupling projection 75 to an insertion hole 27 of the drive gear 20, so that the click spring 70 is rotated in conjunction with the spool when it is rotated. The crown gear type of click plate 60P includes one or more interlocking projections 65 (four interlocking projections are shown in the drawing), which are inserted into one or more interlocking holes 29b (four interlocking holes are shown in the drawing) of the ratchet 29, so that the click plate 60P is not rotated but is fixed regardless of the rotation of the spool resulting from the unwinding of the fishing line.

Figure 10:
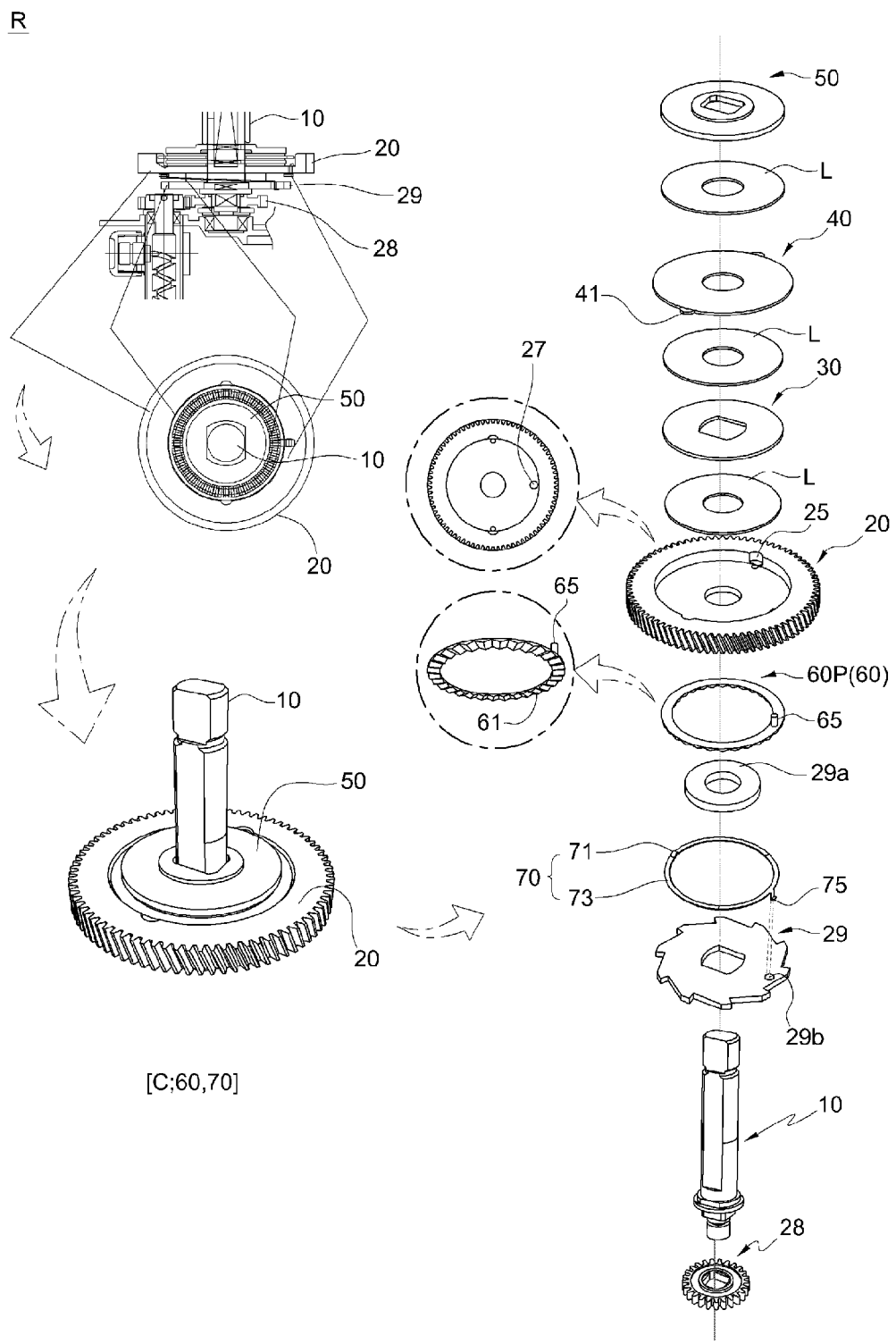

The embodiment of FIG. 10 is similar to that of FIG. 9, but is different from that of FIG. 9 in terms of the positions of the click plate 60P and the click spring 70.

In more detail, the click plate 60P is coupled via the interlocking projection 65 to the insertion hole 27 of the drive gear 20 to be operated in conjunction with the drive gear 20. The click spring 70 is coupled via the coupling projection 75 to the interlocking hole 29b of the ratchet 29, so that the click spring 70 is not rotated but is stopped regardless of the rotation of the spool S resulting from the unwinding of the fishing line.

Figure 11:
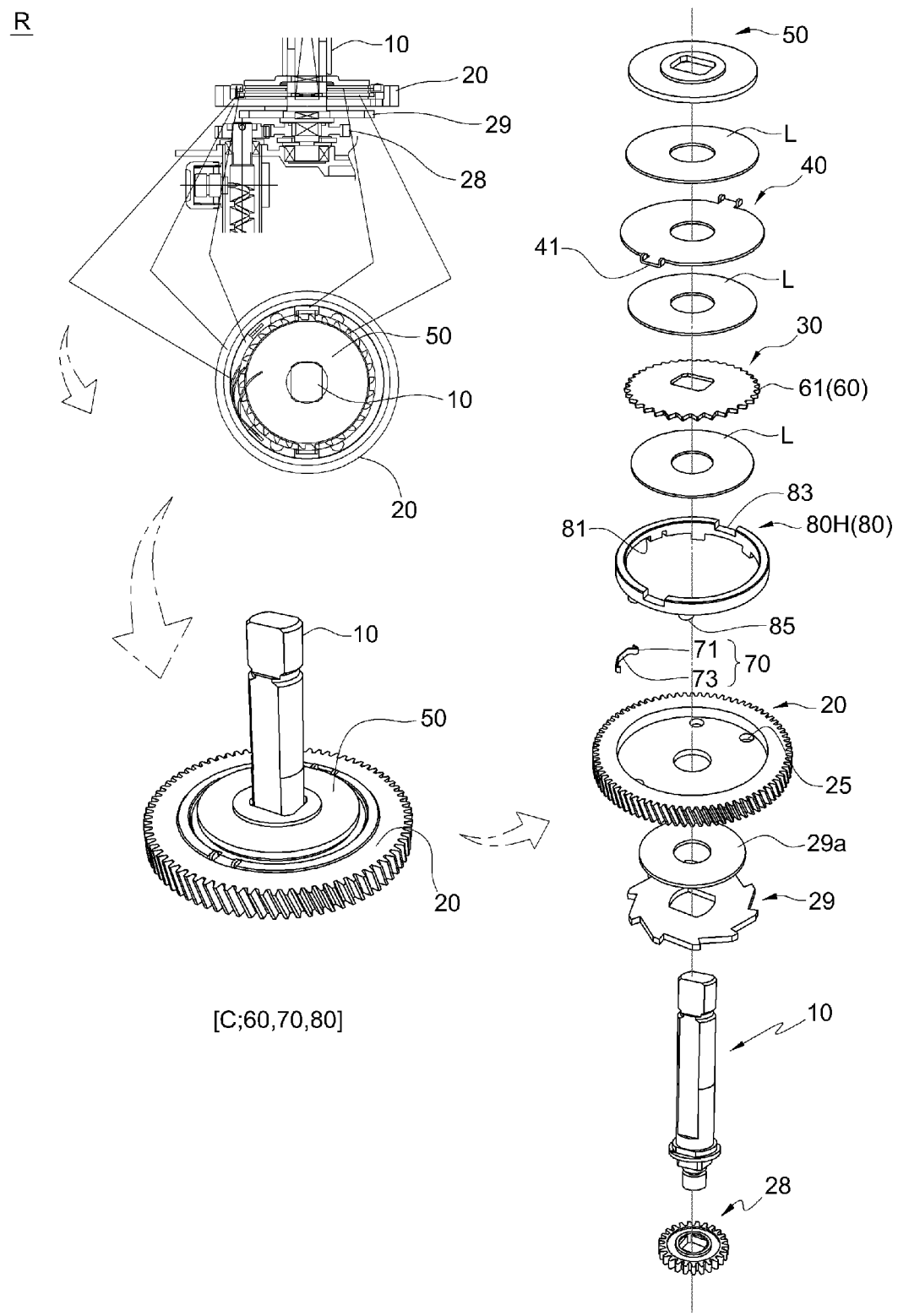

According to a modification of FIG. 11, the spring contact part 61 (the important part of the click member 60) is formed on the drive washer 30. The click spring 70 is secured to the independent holder 80H.

Similarly to the structure of the holder shown in FIG. 7, the holder 80H has the lower interlocking projection 85 which is inserted into the interlocking hole 25 of the drive gear 20. Further, the holder 80H has the interlocking slit 83 which engages with the projection 41 of the auxiliary washer 40.

The holder 80H also includes an exposure part 81 to which the protruding part 71 is coupled in such a way as to be exposed, so that the protruding part 71 of the click spring 70 may come into contact with the spring contact part 61 formed on the outer circumference of the drive washer 30 placed on the inner circumference of the holder 80H.

Figure 12:
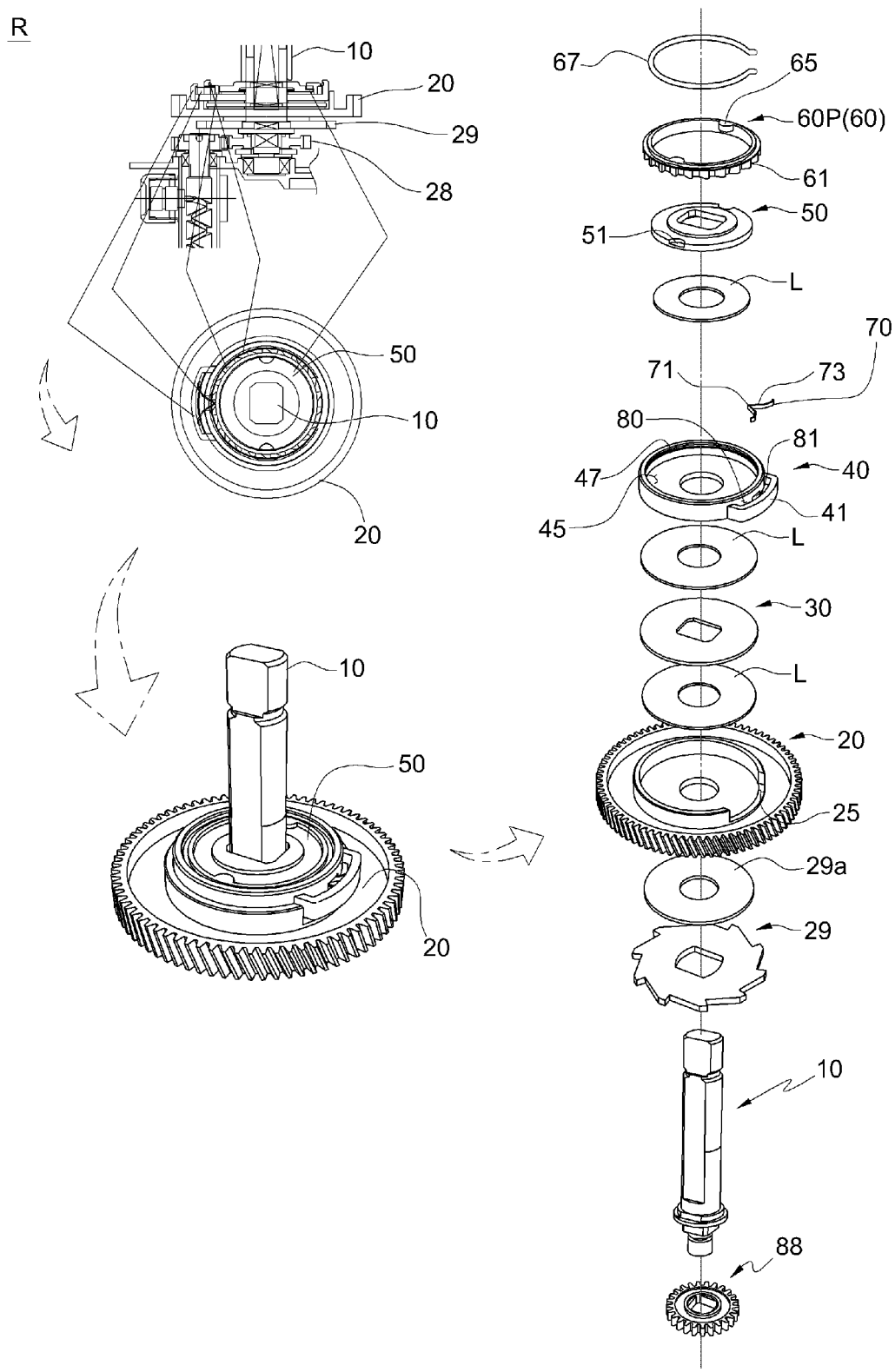

FIG. 12 shows a clicking sound generating means according to a modification of the present invention. The clicking sound generating means includes the independent click plate 60P and the independent click spring 70.

As seen in the exploded perspective view of the right-hand side of the drawing, the click plate 60P has one or more interlocking projections 65, especially two interlocking projections, on the inner circumference thereof, so that the interlocking projection 65 engages with an interlocking recess 51 formed in an upper portion of the cover washer 50 which is placed under the click plate 60P. Thereby, the click plate 60P is not rotated but is stopped, regardless of the rotation of the spool S which results from the fishing line unwinding.

The lubrication washer L, the cover washer 50, and the click plate 60P are sequentially seated in a receiving part 45 of the auxiliary washer 40 which is located at a lower position. An annular groove 47 is formed in an inner surface of an upper portion of the auxiliary washer 40, so that a support spring 67 (especially, C-type spring) is inserted into the annular groove 47, thus preventing the removal of the click plate 60P.

Meanwhile, the click spring 70 is coupled to the projection 41 which is provided on an outer wall of the auxiliary washer 40. The projection 41 engages with the interlocking hole 25 of the drive gear 20 to fulfill its original purpose, that is, an interlocking function, and has a space to serve as the holding member 80, so that the click spring 70 may be received in the projection 41.

Further, the exposure part 81 in the shape of a hole enables the protruding part 71 to be exposed, thus allowing the protruding part 71 of the click spring 70 to come into contact with the spring contact part 61 provided on the outer circumference of the click plate 60P which is located in the receiving part 45 defined in the auxiliary washer 40.

The click spring 70 may comprise two springs which overlap each other for elastic reinforcement as necessary.

Even though a description of the general construction of a fishing reel, including a tension nut, is omitted hereinbefore, it could be easily conceived by those skilled in the art.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, the present invention provides a fishing reel, in which a drive washer or a separate click plate is utilized as a click member, and an auxiliary washer interlocking with a drive gear is utilized as a click spring or a separate click spring is adopted as the click spring, and an auxiliary washer, a drive gear, or a ratchet is utilized to independently hold the click spring or a holder serving as a separate holding member is adopted, and in which, when the auxiliary washer is used as the click spring, it is integrated with the auxiliary washer by cutting and bending a predetermined portion of the auxiliary washer, thus minimizing the number of parts, and in which a pre-existing brake function for preventing a fishing line from being damaged or cut is implemented, and in addition, the function of generating a double clicking sound is implemented to provide a rhythmical and unique clicking sound that enhances the attractiveness of fishing, and in which easy manufacture and assembly are ensured while minimizing changes made to the structure of a conventional fishing reel, and a superior clicking sound generating means having cost competitiveness is achieved, thus providing a rhythmical clicking sound for enhancing the attractiveness of fishing, in addition to preventing the fishing line from being damaged or cut by the pre-existing brake function, and in which the clicking sound generating means, including a click member with a spring contact part and a click spring with a protruding part that makes frictional contact with the spring contact part, is formed using various washers arranged between a drive gear interlocking with a spool for winding the fishing line thereon and a central shaft for the drive gear, thus enabling the easy assembly, improving productivity, reducing the defective rate and the failure rate, obtaining cost competitiveness, and allowing parts of the conventional fishing reel to stay the same without being changed, therefore maximizing cost competitiveness, and remarkably increasing the convenience of stock clearance.

What is claimed is:

1. A fishing reel, comprising:
a central shaft;
a drive gear coupled to the central shaft;
a spool connected to the drive gear, with a fishing line being wound around an outer circumference of the spool;
a drive washer mounted to the central shaft to interlock with the central shaft;
an auxiliary washer mounted to the central shaft, and having on an outer circumference thereof a projection to interlock with the drive gear; and
a clicking sound generator, comprising:
a click member operated in conjunction with the central shaft or the drive gear, and including a spring contact part; and
a click spring operated in conjunction with the drive gear or the central shaft, and including a protruding part coming into contact with the spring contact part of the click member, and an elastic part integrated with the protruding part to put the protruding part in contact with the spring contact part.

2. The fishing reel as set forth in claim 1, wherein the click spring of the clicking sound generator is integrated with the auxiliary washer by cutting and bending a predetermined portion of the auxiliary washer.

3. The fishing reel as set forth in claim 2, wherein the click spring of the clicking sound generator is integrated with the auxiliary washer by cutting and bending a predetermined portion of the auxiliary washer, and comprises a plurality of click springs, and
a plurality of spring contact parts is provided on the click member to correspond to the click springs.

4. The fishing reel as set forth in claim 1, wherein the drive washer functions as the click member of the clicking sound generator, and the spring contact part is provided on the drive washer.

5. The fishing reel as set forth in claim 1, wherein the click spring of the clicking sound generator is coupled to a holding member.

6. The fishing reel as set forth in claim 5, wherein the holding member is a holder which is secured to the drive gear.

7. The fishing reel as set forth in claim 5, wherein the holding member is provided on the auxiliary washer.

8. The fishing reel as set forth in claim 5, wherein the click member of the clicking sound generator is a click plate, and the click plate interlocks with the drive washer.

9. The fishing reel as set forth in claim 5, wherein the click member of the clicking sound generator is a click plate, and the click plate interlocks with the drive gear.

10. The fishing reel as set forth in claim 5, wherein the drive washer functions as the click member of the clicking sound generator, and the spring contact part is provided on the drive washer.

\* \* \* \* \*